May 30, 1967     R. K. GETMAN     3,322,150
VALVE
Filed Dec. 10, 1964
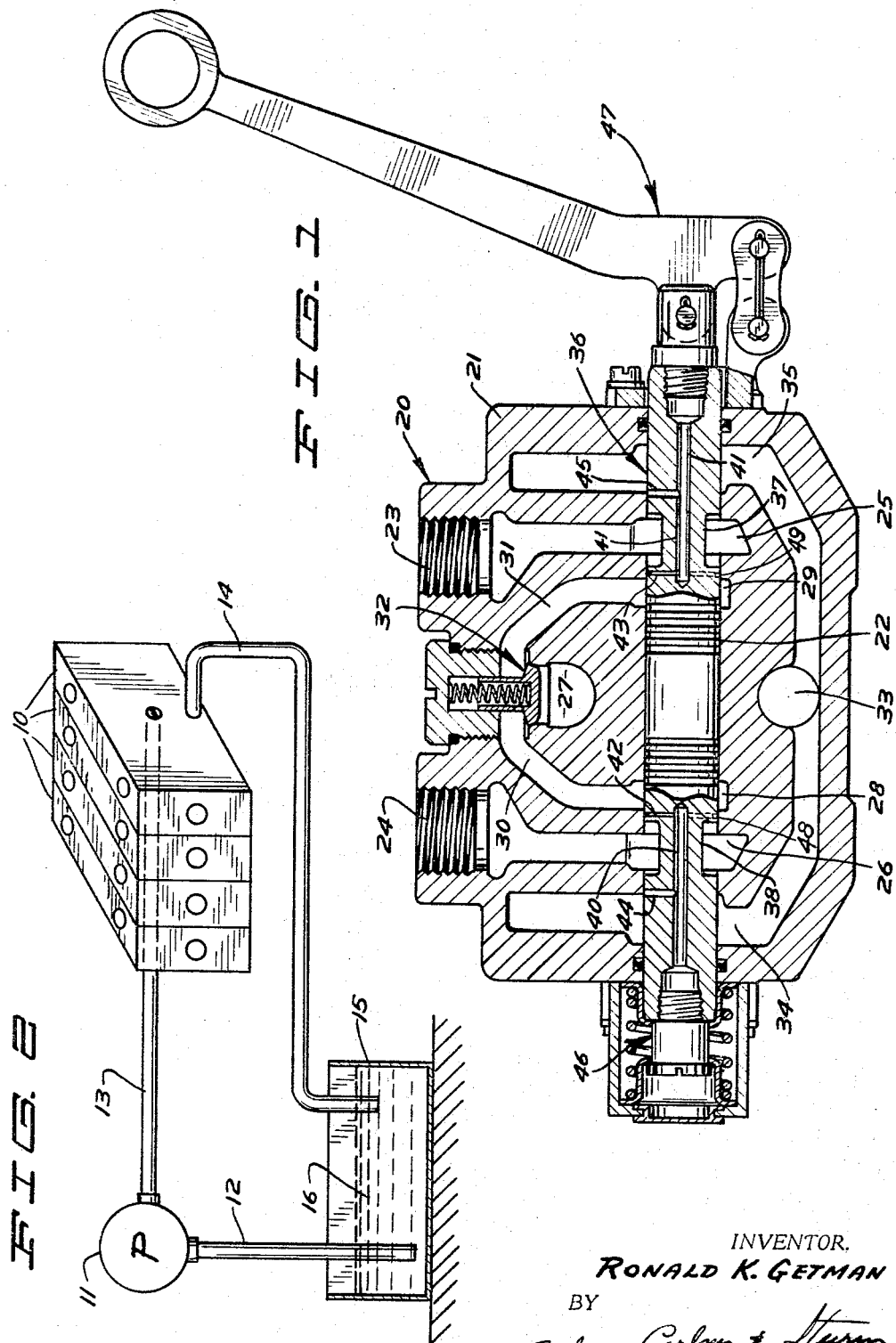
INVENTOR.
RONALD K. GETMAN
BY
Carleen, Carleen & Sturm
ATTORNEYS

United States Patent Office

3,322,150
Patented May 30, 1967

3,322,150
VALVE
Ronald K. Getman, Minnetonka Village, Minn., assignor to Gresen Manufacturing Company, Minneapolis, Minn., a corporation of Minnesota
Filed Dec. 10, 1964, Ser. No. 417,379
3 Claims. (Cl. 137—625.38)

This invention relates generally to hydraulic control systems and valve operators therefor and is more particularly directed to the class of hydraulics control systems known as closed center systems in which hydraulic fluid under pressure is constantly supplied to one or more of a plurality of control valves that may be used to selectively control the operation of fluid utilization devices and apparatus.

In prior art systems of the class with which my invention is concerned, a long standing problem has existed with the leakage of hydraulic fluid, constantly supplied under pressure to control valves in such a system, through various portions of the valves to the fluid utilization devices to which they are connected to control when the valves are in a neutral position. This has resulted in undesired actuation or slipping of the fluid utilization devices causing accidents involving operators and damage to apparatus under control of the hydraulic system. I have discovered that the leakage of fluid under pressure supplied to inlet ports on control valves to control ports connected to fluid utilization devices is the principal cause of this problem.

As will be set forth in greater detail below, my invention, which may be used with many different forms of hydraulic control valves that are operable between a neutral position and flow controlling position to control the flow of hydraulic fluid to and from fluid utilization devices, including open and closed center valves, is designed to be applied to the class of hydraulic systems known as closed center systems in which hydraulic fluid under pressure is continuously applied to the inlet ports of one or more of a plurality of valves in the system. I have discovered that the addition of a fluid bypassing means which is adapted to conduct fluid from a location adjacent the inlet port on a control valve to an exhaust port when the valve is in a neutral position, will substantially eliminate the problem that has existed because of the leakage of hydraulic fluid under pressure from the inlet port to the control port on the control valve.

It is therefore an object of my invention to provide an improved control valve for use in a closed center hydraulic system.

A further object of my invention is to provide an improved control valve having a bypass duct adapted to allow fluid leaking from an inlet port to an exhaust port to bypass any control ports therein.

A still further object of my invention is to provide novel and improved hydraulic control apparatus which may be operable in a closed center hydraulic system.

These and other objects of my invention will become apparent from a consideration of the appended specification, claims and drawing, in which—

FIG. 1 is a sectional and broken away view of a typical hydraulic control valve embodying and illustrating the principles of my invention; and FIG. 2 is a schematic and diagrammatic representation of a closed center type of hydraulic control system embodying a number of control valves such as illustrated in FIG. 1 of the drawing.

Referring now to FIG. 1, there is shown a closed center, four-way control valve indicated generally by reference character 20. Control valve 20 has a body member 21, shown in section, that is provided with an axially extending bore 22 and, extending axially in both directions from its mid-point, a pair of inlet ports 28 and 29, a pair of control ports 26 and 25 and a pair of exhaust ports 34 and 35. Exhaust ports 34 and 35 are shown in fluid communication with an exhaust duct 33 adapted to be suitably connected to a fluid reservoir. Inlet ports 28 and 29 are shown connected to an inlet duct 27 through a pair of ducts 30 and 31, respectively. A check valve 32 is shown disposed intermediate inlet duct 27 and ducts 30 and 31 so as to prevent reverse flow of fluid into inlet duct 27 when a plurality of valves are connected in parallel, through corresponding inlet duct 27 to a suitable source of hydraulic fluid under pressure. Control ports 26 and 25 are shown in fluid communiaction with a corresponding pair of control fluid ducts 24 and 23 for connection to, for example, a reversible hydraulic cylinder, or the like. A fluid valving means, shown in the form of spool member 36 is shown slidably disposed in axial bore 22 and is provided with a centering means 46 at its left hand end and a lever operating means 47 operatively connected to selectively position spool member 36, at its right hand end. Spool member 36 is shown having a pair of axially extending control grooves 38 and 37 symmetrically disposed with respect to its center. Grooves 38 and 37 are operable upon displacement of spool member 36 from its indicated neutral position, to selectively connect control ports 26 and 25 to inlet ports 28 and 29 or exhaust ports 34 and 35 in a manner well known to those skilled in the art with which my invention is concerned. Also provided in spool member 36 are a pair of axially extending ducts 40 and 41, each in fluid communication with radially extending ducts 42 and 44 and 43 and 45, respectively. Ducts 42 and 43 may also be provided with an outwardly radially opening, peripherally disposed grooves 48 and 49, respectively. It may be seen that radial ducts 42 and 43 and grooves 48 and 49 are disposed on the land extending intermediate inlet ports 28 and 29 and control ports 26 and 25, respectively when valve spool member 36 is in its neutral position. It may likewise be seen that radially extending ducts 44 and 45 are disposed on spool member 36 whereby displacement of spool member 36 on either side of its neutral position will place ducts 44 or 45 on the land extending intermediate exhaust port 34 and 35 and control ports 26 and 25 before radially extending ducts 42 or 43 are in direct fluid communication with inlet ports 28 and 29.

In FIG. 2 a fluid reservoir 15 containing a suitable amount of hydraulic fluid 16 is shown connected to a pump 11 through suitable duct means 12. The output of pump 11 is connected through a duct 13 to the inlet ducts on a plurality of control valves indicated generally by reference character 10. It may be noted that the right hand valve of the plurality of valves 10 has a plug in the end of the inlet duct. An exhaust duct 14 is shown emanating from the right hand valve 10 and while not shown in the drawing, it will be readily apparent to those skilled in the art that exhaust duct 14 may be connected through the plurality of valves in fluid communication with, for example, exhaust ducts 33 extending through each of the valves which would be provided with a suitable plug means on the left end of the left hand valve of the plurality of valves 10. Pump 11 may be any suitable pump that is adapted to supply fluid under pressure to the plurality of valves 10 regardless of whether the valves are in their flow controlling or neutral positions and it may be recognized by those skilled in the art that the apparatus shown generally in FIG. 2 is a closed center type hydraulic system to which valves embodying the principle of my invention as illustratively shown in FIG. 1, may be incorporated therein.

In operation, fluid under pressure is applied to inlet duct 27 on valve 20 and the pressure is transmitted through check valve 32 to inlet ports 28 and 29. With spool member 36 in the neutral position shown in FIG. 1, fluid under pressure will bypass control ports 26 and 25 through radially extending ducts 42 and 43, axially extending ducts 40 and 41 and radially extending ducts 44 and 45 to exhaust ports 34 and 35, respectively. Thus, fluid under pressure that may normally find its way to the fluid utilization devices connected to control ports 26 and 25, is bypassed therefrom and the undesired actuation of the fluid utilization devices is effectively prevented.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a closed center hydraulic system, a control valve comprising in combination;
   (a) a body member;
   (b) inlet, exhaust and control ports in said body member; and
   (c) valving means having a neutral position and being operable to selectively connect said control port to said inlet and exhaust ports, said valving means including unobstructed bypassing means extending intermediate a groove in said valving means disposed adjacent said inlet port and said exhaust port when said valving means is in said neutral position.

2. A control valve for use in combination with a source of hydraulic fluid under pressure for selectively controlling the flow of fluid to hydraulic fluid utilization means comprising in combination;
   (a) a valve body having an axial spool receiving bore;
   (b) a plurality of axially disposed ports in fluid communication with said bore, one of said ports comprising an inlet port adapted for connection to a source of fluid under pressure, another of said ports comprising an exhaust port and another of said ports comprising a control port adapted to be connected to a fluid utilization means; and
   (c) a spool member including an axially extending groove portion, said spool member being slidably disposed in the bore in said valve body and selectively movable between a neutral position and positions connecting said control port to said inlet port and said exhaust port, said spool member further including an unobstructed peripheral groove disposed intermediate said inlet port and said control port and connected to fluid bypassing means disposed in said spool member to transmit leakage fluid from a location adjacent the inlet port to said exhaust port when said spool is in its neutral position.

3. A hydraulic control valve for use in combination with a source of hydraulic fluid under pressure for selectively controlling the flow of said fluid to hydraulic fluid utilization means comprising in combination;
   (a) a valve body having an axial spool receiving bore;
   (b) inlet, control and exhaust ports spaced axially of said bore and in fluid communication therewith;
   (c) a spool member slidably disposed in said bore, said spool member including;
      (aa) an outwardly opening flow control groove extending axially therealong for a distance less than the distance intermediate said inlet and exhaust ports;
      (bb) an unobstructed outwardly opening bleed groove, in open communication with the bore of said valve body, disposed adjacent one end of said flow control groove; and
      (cc) duct means extending intermediate said bleed groove to a location adjacent the other end of said flow control groove, so that said bleed groove is effectively connetced to said exhaust port only when said spool is in a neutral position.

References Cited
UNITED STATES PATENTS

| | | | |
|---|---|---|---|
| 1,123,273 | 1/1915 | Gregersen | 137—625.69 |
| 3,073,340 | 1/1956 | Hancock | 137—625.69 XR |
| 3,191,626 | 6/1965 | Leibfritz | 137—625.69 |

M. CARY NELSON, *Primary Examiner.*

MARTIN P. SCHWADRON, *Examiner.*

R. J. MILLER, *Assistant Examiner.*